United States Patent

Konucik et al.

[11] 4,043,067
[45] Aug. 23, 1977

[54] SUPER FROG GIG

[76] Inventors: George J. Konucik, P.O. Box No. 9482, Richmond, Va. 23228; Thomas B. Robertson, 1206 Arnoka Road, Mechanicsville, Va. 23111; Robert Davis, Rte. 5, Box 1588, Powhatan, Va. 23139

[21] Appl. No.: 663,920

[22] Filed: Mar. 4, 1976

[51] Int. Cl.² .............................................. A01K 81/04
[52] U.S. Cl. ........................................ 43/6; 145/64; 294/61
[58] Field of Search .................... 43/6; 294/61; 145/64

[56] References Cited

U.S. PATENT DOCUMENTS

| 1,269,413 | 6/1918 | Finnigan | 145/64 |
| 1,570,306 | 1/1926 | Johnson | 294/61 X |
| 3,050,897 | 8/1962 | Pitts | 43/6 |

FOREIGN PATENT DOCUMENTS

| 317,580 | 1/1957 | Switzerland | 145/64 |

Primary Examiner—Louis G. Mancene
Assistant Examiner—Daniel J. Leach

[57] ABSTRACT

A spear for hunting frogs, the spear being made from a straight length of drill rod, which extends from one end of an elongated wooden handle, the protruding portion of the drill rod having its outward end flattened on both sides and tapered towards a barbed point, the point being heat treated and oil hardened so that the point will remain sharp even though being subjected to striking against rock and the like while hunting frogs out of doors.

2 Claims, 2 Drawing Figures

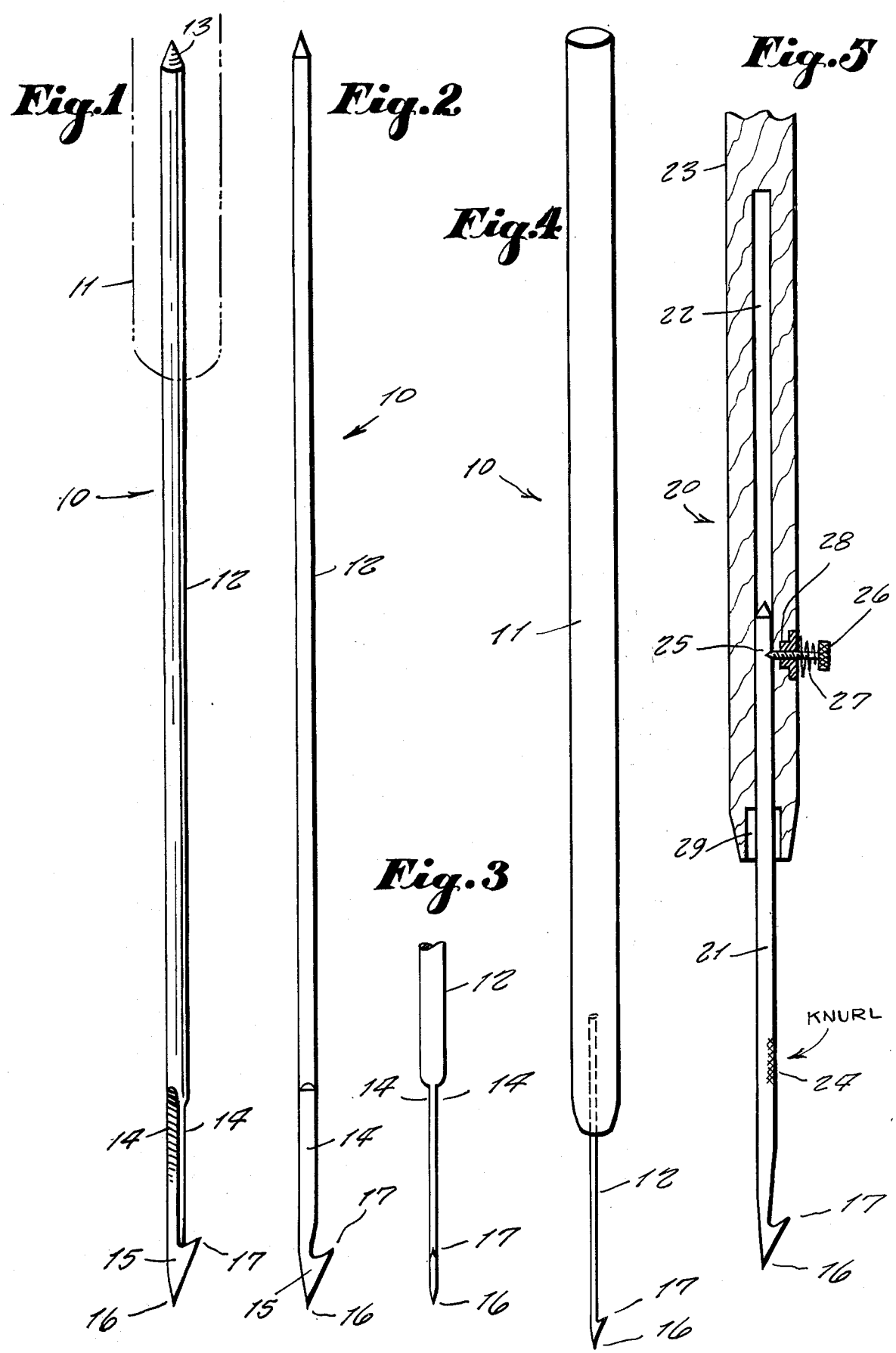

SUPER FROG GIG

This invention relates generally to hunting equipment. More specifically, the present invention relates to a weapon for hunting frogs.

A principal object of the present invention is to provide a super frog gig in which the piercing element thereof is made of drill rod, so that it can be heat treated and oil hardened in order that the point will not become dull when striking against a rock or other hard surface when being thrust towards a frog.

Another object of the present invention is to provide a super frog gig, which will not bend and thus partly cripple a frog, driving it under water and finally escaping, which is cruel and, therefore, not good sportsmanship.

Yet another object is to provide a super frog gig, which is light in weight and easy to control when aiming toward a frog.

Other objects are to provide a super frog gig, which is inexpensive to manufacture, rugged in construction, easy to use and efficient in operation.

These and other objects will be readily evident upon a study of the following specification and accompanying drawing, wherein:

FIG. 1 is a perspective view of the present invention;

FIG. 2 is a side elevation view thereof;

FIG. 3 is a fragmentary front view thereof;

FIG. 4 is a side view of the invention mounted in a handle;

FIG. 5 is an enlarged cross sectional view of a modified design of the invention, in which the gig is retractable into the handle, when not in use, so to protect the point and at the same time prevent injury to a person by the point being exposed.

Reference is now made to the drawing in greater detail, and more particularly to FIGS. 1 through 4 thereof at this time, wherein the reference numeral 10 represents a super frog gig made from a straight length of drill rod material and which at one end thereof is inserted into an end of a handle 11. Formed on the longitudinal straight drill rod 12, accordingly, is a conically tapered point 13 at one end for insertion into the handle 11. The opposite end of the drill rod has a flat surface 14 on opposite sides thereof so to form a relatively flat blade 15, which tapers toward a point 16 and which includes a sidewardly offset hook 17.

The implement thus formed is ideal for hunting frogs, and will penetrate completely through the frog so that it does not have a chance to escape in a crippled condition. The point 16 being heat treated and oil hardened will remain sharp even though it accidentally strikes against a rock or stone during a hunting operation.

Reference is now made to FIG. 5, wherein there is a modified design of the super frog gig 20 in which the gig drill rod 21 is retractable into an opening 22 within the end of handle 23 so that the point 16 thereof is thus not exposed for being damaged or doing a harm to any person coming into contact therewith. The gig drill rod 21 can be maintained in a retracted position by means of a knurl 24 on a side thereof being engaged by a pointed end 25 of a set screw 26 supported transversely in the handle 23 as shown. A compression coil spring 27 is located between the head of the set screw 26 and a metal plate 28 being installed within the handle 23 and which includes a threaded opening for engaging screw threads. When the gig drill rod 21 is in an extended position, as illustrated in FIG. 5, the conical point 25 of the set screw engages a notch in the drill rod, thus securing the same fixedly in the extended position so that it will not retract while in use during a frog hunt.

A recess 29, in the end of the handle 23, serves to receive the side with the offset hook 17 of the drill rod, so that the entire point of the gig drill rod is thus fitted into the interior of the handle so as to be completely out of the way.

Thus, there is provided various forms of a super frog gig.

While various changes may be made in the detail construction, it is understood that such changes will be within the spirit and scope of the present invention as is defined by the appended claims.

What I now claim is:

1. A super frog gig, comprising, in combination, an elongated, straight drill rod having one end thereof tapered to a conical point and inserted into an end of a wooden handle, an opposite end of said drill rod incorporating a means for piercing through a frog during a frog hunt; said means comprising said opposite end having a flat face on opposite sides thereof so as to form a relatively flat blade, said flat blade having a tapered point upon an end thereof and a sidewardly extending offset hook, said drill rod being retractable within said end of said handle, said end of said handle having an elongated opening that is equal to a length of said drill rod, a transverse set screw threaded in said handle having a conical point which selectively engages a notch in a side of said drill rod when said drill rod is in an extended position, and said conical point of said set screw engaging a knurled surface of said drill rod when said drill rod is in a retracted position.

2. The combination as set forth in claim 1, wherein a recess upon an end of said handle receives said drill rod point and hook.

* * * * *